Figures 1, 2:
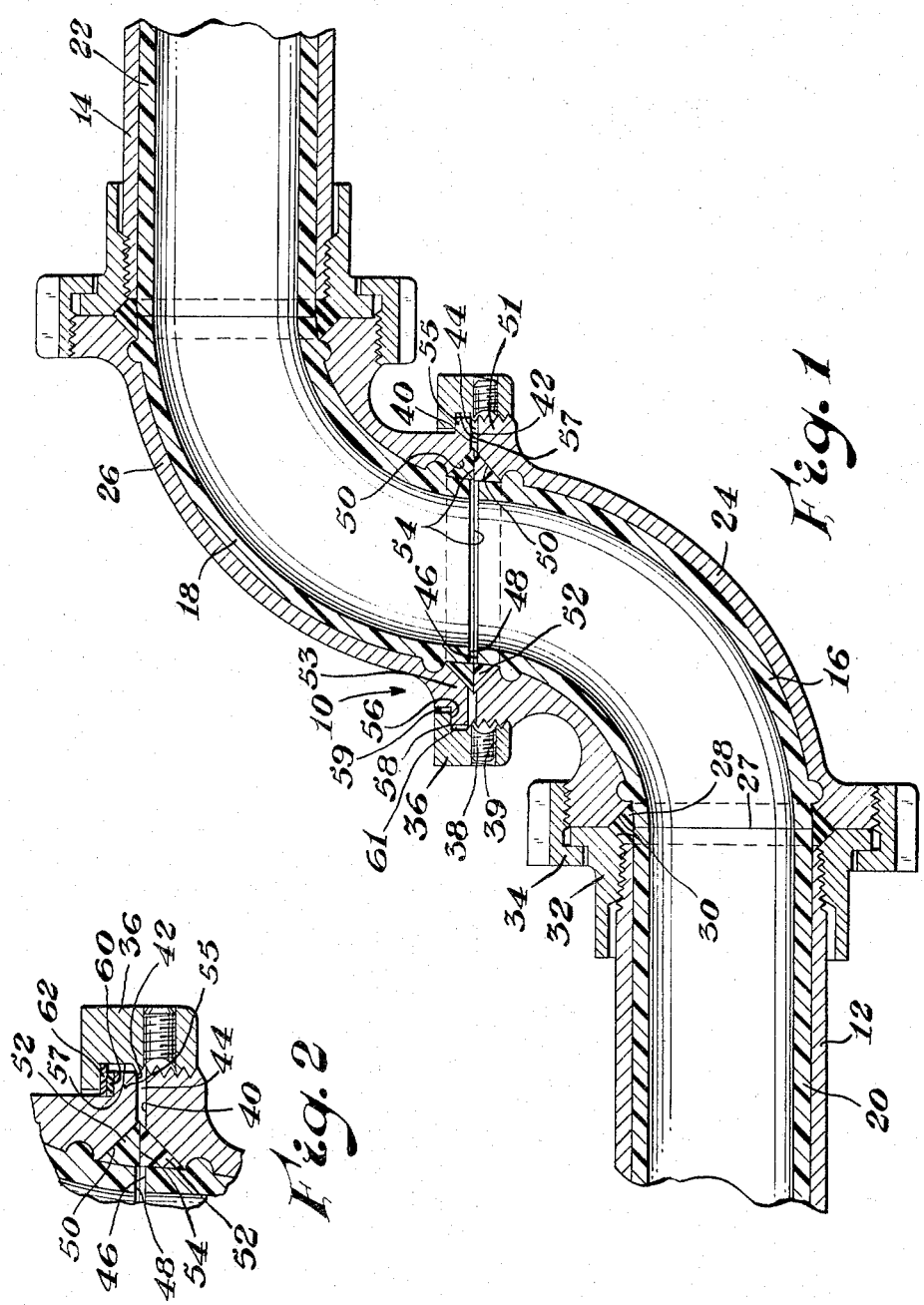

Nov. 8, 1966  D. L. McINTOSH ETAL  3,284,106
SWIVEL JOINT
Filed Aug. 4, 1964

INVENTORS.
Donald L. McIntosh
Wilbur T. Stephenson
BY
ATTORNEYS

United States Patent Office 3,284,106
Patented Nov. 8, 1966

3,284,106
SWIVEL JOINT
Donald L. McIntosh and Wilbur T. Stephenson, Bay City, Mich., assignors to The Dow Chemical Company, Midland, Mich., a corporation of Delaware
Filed Aug. 4, 1964, Ser. No. 387,305
1 Claim. (Cl. 285—55)

This invention relates generally to pipe connections and, more particularly, to a novel swivel joint specifically advantageous for plastic lined piping.

When handling corrosive chemicals and the like it is necessary that metallic pipe sections be lined with a corrosive resistant material, such as saran, "Penton" (a chlorinated polyether thermoplastic polymer), polypropylene, etc. In interconnecting pipe sections at different levels or in differing positions, it has in the past been necessary to use joints which fix the relationship of the pipe sections. To readjust the relationship of already interconnected pipe sections, one had to first loosen the joint, adjust the pipe sections and then retighten the joint. This would usually break the seal between the pipe sections.

The prior art joints, because they were fixed or difficult to adjust, also failed to provide the flexibility needed when it was desired to load tank cars and the like from a pipe line. Since a swivel joint was lacking, it was impractical to swing a pipe line from its usual position to a position over a tank car for filling.

Accordingly, one of the objects of the present invention is to provide a novel swivel joint particularly advantageous for connecting pipe sections, which joint can connect these sections in any one of a plurality of of different arrangements without requiring loosening or disassembly and re-assembly of the parts thereof.

A still further object of the present invention is to provide a novel swivel joint adapted to cooperate with plastic lined pipe, and which permits varying interconnections between two sections thereof while retaining the seal necessary to prevent corrosive chemicals contained in the pipe from contaminating adjacent areas.

Yet another object of the present invention is the provision of mating substantially frictionless half gaskets forming bearing surfaces for a joint which permits secured pipe sections to be swivelled about an angle of 360°.

Briefly, the present invention comprises a swivel joint, which joint when used in conjunction with plastic lined pipe sections retains a seal by back-up corrosive resistant half-gaskets. The joint can rotate providing the necessary abutting bearing surfaces. A novel spanner or thimble (as it is more commonly known) nut having sliding surfaces mating with one of the interconnected pipe sections permits the free rotation to be achieved without loosening of the joint, thus complementing the abutting gasket arrangement.

Yet additional objects and advantages of the present invention, and its numerous cognate benefits and features are even more apparent and manifest in and by the ensuing description and specification taken in conjunction with the accompanying drawing in which, wheresoever possible, like characters of reference designate corresponding material and parts throughout the views thereof, and in which:

FIGURE 1 is a cross-sectional view of one embodiment of the present invention; and FIGURE 2 is an enlarged fragmentary cross-sectional view of a modification of the embodiment of FIGURE 1.

Referring more particularly to FIGURE 1, there is shown a union-type swivel joint 10 interconnecting L sections 24 and 26 which, in turn, connect two straight line pipe sections 12 and 14. In this particular embodiment, L sections 24 and 26 and pipe sections 12 and 14 each include a plastic lining, the linings identified by reference characters 16, 18, 20 and 22, respectively.

The interconnection between pipe section 12 and L section 24 is the same as that between pipe section 14 and L 26, which connection is well-known and will be briefly described hereinafter to more fully disclose an environment situation for the present invention.

Pipe section 12 and L section 24 are joined by a fixed arrangement which is formed by bringing abutting ends of plastic linings 20 and 16 forcibly together to form a sealed juncture 27. This juncture is backed up by a full gasket 28, of a triangular cross-section and preferably made of rubber. Gasket 28 is held in complementary seats or recesses 30 formed in the wall of L 24 and a coupler 32, the latter being threadably engaged with the end of pipe section 12. A standard type spanner nut 34, which is threadably engaged on the end of L section 24, fits in a tongue and groove fashion with coupler 32 to secure the pipe section 12 and L section 24 together. It is noted that no adjustment between pipe section 12 and L section 24 is possible once the interconnection is secured.

In contrast to the aforesaid well-known pipe connection is the novel swivel joint connection of the present invention. Here L sections 24 and 26 are connected together by a special spanner nut 36, the latter preferably including four equally-spaced set screws 38 in threaded cavities 39. In this instance, the spanner nut 36 is given such a width that it can secure the joint without having to pull the facing (metallic) ends 40 and 42 of I sections 24 and 26, respectively, together in an abutting relationship. The gap 44 between facing ends 40 and 42 need not be of any specific dimension, e.g., ⅛ of an inch is satisfactory, but it should be designed to be large enough to prevent any possibility of these surfaces mating when spanner nut 36 is set. Facing ends 46 and 48 of plastic linings 16 and 18, repectively, are similarly spaced, e.g., ¹⁄₁₆ of an inch, so that they likewise will not be engaging one another when the L sections 24 and 26 are connected together by spanner nut 36. In behind facing ends 46 and 48 of plastic linings 16 and 18 are found recesses or seating portions 50 which complement one another and are formed within facing ends 40 and 42 of the L sections.

Located within each recess 50 is a half gasket 52 formed of a material having substantially similar characteristics of corrosion resistance and natural lubricity and compressive strength as polytetrafluoroethylene. In this instance, gaskets 52 are triangularly shaped and present opposed bearing surfaces 54 mating with one another. They are substantially parallel with the facing ends 40 and 42 and extend beyond the periphery thereof.

When the spanner nut 36 is tightened, it brings these bearing surfaces 54 snugly against one another to prevent seepage of the materials being transported through the pipes. Since the oppositely facing surfaces 40, 42, 46 and 48 are not engaged with one another, it is only these almost frictionless bearing surfaces 54 which form the corrosive resistant seal.

To secure the novel connection, spanner nut 36 is threadedly engaged with end 51 of L section 16 and, by a slidable tongue and groove engagement, with the end 53 of L section 26. More specifically, tongue 55 of end 53 fits within groove 57 of spanner nut 36 so that only surfaces 56 and 58 of tongue 55 and groove 57, respectively, are engaged with one another. Tongue 55 and groove 57 are otherwise separated by spaces 44, 59 and 61. Grease can be located between surfaces 56 and 58 to make the spanner nut 36 and L section 26 slidable with respect to one another. Thus, it can readily be seen that since the only abutting surfaces (54, 56 and 58) at the joint 10 are slidable with one another, L sections 24 and 26 can rotate a full 360° with respect to each other without breaking the fluid tight seal at the joint.

It is further contemplated to be within the scope of this invention that the abutting surfaces of tongue 55 and groove 57 can be almost frictionless by using ring inserts 60 and 62 formed of a material such as polytetrafluoroethylene, nylon, polypropylene, etc., if desired, as shown in FIGURE 2. In this particular instance, ring inserts 60 and 62 are secured, by conventional adhesives, to the oppositely facing surfaces of tongue 55 and groove 57, respectively. This permits relatively free rotation of the swivel joint, when a little force is applied, without disturbing the seal between the bearing surfaces 54.

While certain representative embodiments and details have been shown for the purpose of illustrating the invention, it will be apparent to those skilled in the art that various changes and modifications can be made therein without departing from the spirit and scope of the invention.

Accordingly, what is claimed as new is:

A swivel joint connecting adjacent sections of pipe comprising two joined sections with complementary seating portions in their facing ends, said end faces being substantially normal in the pipe axis, the ends each having an annular recess with a radially inwardly sloping facing surface acute to the axis of said pipe and intersecting the inner wall of said pipe, said recesses defining a V, a self-lubricating gasket fitted in each recess, the outer face of each gasket being located in a plane parallel with but axially and beyond the facing end of the section in which it is fitted, each said face being smooth and in sealing contact with the face of said other gasket, one of said joined sections being peripherally threaded at the facing end on the outside, and the other of said joined sections having a flange about its periphery on the outside, a thimble nut with at least one set screw therein threaded on said peripheral threads of said one joined section and engaging said flange on the other joined section, and lubricant means disposed between said thimble nut and said flange and a lining embracing the inside surfaces of each said joined section, said linings overlapping in continuous surface contact said gaskets fitted within said recesses whereby swivel action between said joined sections is possible without upsetting the seal of said sealing contact of said gaskets of said recesses, and means to prevent movement of said lining with respect to the inner pipe wall.

References Cited by the Examiner

UNITED STATES PATENTS

| 2,726,104 | 12/1955 | Boitnott et al. | 285—354 X |
| 3,004,783 | 10/1961 | Webb | 277—124 X |
| 3,052,489 | 9/1962 | Stoudt | 285—352 X |
| 3,135,128 | 6/1964 | Rudolph | 277—95 X |
| 3,142,499 | 7/1964 | Lang | 285—55 |

FOREIGN PATENTS

| 526,147 | 8/1954 | Belgium. |

CARL W. TOMLIN, *Primary Examiner.*

T. A. LISLE, *Assistant Examiner.*

UNITED STATES PATENT OFFICE
CERTIFICATE OF CORRECTION

Patent No. 3,284,106                          November 8, 1966

Donald L. McIntosh et al.

It is hereby certified that error appears in the above numbered patent requiring correction and that the said Letters Patent should read as corrected below.

Column 1, line 48, after "rotate" insert -- a full 360° by means of the half gaskets, the latter --.

Signed and sealed this 12th day of September 1967.

(SEAL)
Attest:

ERNEST W. SWIDER                       EDWARD J. BRENNER
Attesting Officer                           Commissioner of Patents